United States Patent [19]
Nishitani et al.

[11] Patent Number: 5,629,714
[45] Date of Patent: May 13, 1997

[54] INFORMATION PROCESSING SYSTEM

[75] Inventors: Shigeyuki Nishitani, Ebina; Michihiro Mese, Chigasaki; Kimiyoshi Ohno, Yokohama; Manabu Sasaki, Fujisawa; Tsuneaki Amanuma, Urawa, all of Japan

[73] Assignees: Hitachi, Ltd.; Hitachi Information Systems, Ltd., both of Tokyo; Hitachi Microsoftware Systems, Inc., Kanagawa-ken, all of Japan

[21] Appl. No.: 843,307

[22] Filed: Feb. 28, 1992

[30] Foreign Application Priority Data

Feb. 28, 1991 [JP] Japan .................... 3-034026

[51] Int. Cl.$^6$ ................................. G09G 5/00
[52] U.S. Cl. ............................. 345/1; 345/115
[58] Field of Search ................... 345/115, 119, 345/2, 1; 348/13, 14, 15, 17; 437/350, 362, 118, 307 R, 323, 336

[56] References Cited

U.S. PATENT DOCUMENTS

| | | | |
|---|---|---|---|
| 4,715,818 | 12/1987 | Shapiro et al. | 434/350 |
| 4,759,717 | 7/1988 | Larochelle et al. | 434/350 |
| 5,027,198 | 6/1991 | Yoshioka | 348/15 |
| 5,262,764 | 11/1993 | Inamori | 345/115 |
| 5,263,869 | 11/1993 | Ziv-El | 434/350 |

FOREIGN PATENT DOCUMENTS

| | | |
|---|---|---|
| 0410378 | 1/1991 | European Pat. Off. . |
| 54-45526 | 4/1979 | Japan ................... 345/2 |

OTHER PUBLICATIONS

"The Point of the Pen", GO's Vice Pres. of Software Examines new PenPoint Operating System by R. M. Carr.
"Groupware", by Robert Johansen, pp. 31–74 (Nikkei BP Company, Apr. 24, 1990, translated by Izumi Aizu).
Tandy, "Color Computer Disk System", 1987. p. 115.
Korte, W. "Multimedia BK Technology for the Support of Distributed Group Work", Wideband Communication (DE) 43(12):872–878, 1990.

*Primary Examiner*—Richard Hjerpe
*Assistant Examiner*—Regina Liang
*Attorney, Agent, or Firm*—Antonelli, Terry, Stout & Kraus, LLP

[57] ABSTRACT

An information processing system which includes at least one terminal having input apparatus for inputting data to the system and transmission apparatus for outputting the data inputted from the input apparatus, a display for displaying data, a communication line for transmitting data outputted from the terminal, and a control unit having at least one receiver buffer for storing data transmitted from the terminal via the communication line. The control unit is operable to display the data, which is stored in the receiver buffer, on the display.

19 Claims, 13 Drawing Sheets

FIG. 4

| INFOR-MATION ID | PAGE | TERMINAL NO. | RESERVED REGION | | DISPLAY FLAG |
|---|---|---|---|---|---|
| | | | $(x_1, y_1)$ | $(x_2, y_2)$ | |
| 1 | 1 | 1 | 0, 0 | 160, 120 | DISPLAYED |
| 2 | | 2 | 0, 121 | 180, 220 | DISPLAYED |
| 3 | | 1 | 0, 221 | 120, 280 | DISPLAYED |
| 4 | | 3 | 0, 281 | 200, 380 | DISPLAYED |
| 5 | | 2 | 200, 0 | 360, 80 | RESERVED |
| 6 | | 3 | 200, 81 | 320, 180 | RESERVED |

INFORMATION PROCESSING SYSTEM

BACKGROUND OF THE INVENTION

1. Field of the Invention

This invention relates to an information processing system for displaying display information from one or more terminals, without designating a display position.

2. Description of the Related Art

An electronic conference system is currently known as a typical system for displaying information, which is inputted from one or more terminals, on a common display. This electronic conference system comprises a large-size common display, a plurality of displays installed at appropriate positions on a conference table, an input unit attached to each display unit, and a control unit for transferring handwritten information, which is inputted from the input unit, between the individual displays. This prior art electronic conference system is disclosed in, for example, Japanese Patent Laid-Open Publication No. 9073/1986.

In the prior art system, when presenting the handwritten information, which is inputted from the individual input units, on the common display, a participant operates a central control key of the associated input unit. This participant thereby takes the initiative in controlling the control unit, whereupon the participant can present his/her opinion on the common display, while being seated, by inputting the opinion from the input unit. However, with the prior art, any participant cannot input his/her opinion from the input unit until the participant takes the initiative in controlling the control unit. Further, although a central control key is equipped on every input unit, it is only possible to input from the input unit which has taken the initiative in controlling the control unit, namely, as long as the control unit is receiving the input from any input unit, it is impossible to input from any other input unit. Consequently the time during which the control unit is monopolized by one input unit at a time tends to be long so that any other participant must handwrite his/her opinion or idea and save the handwritten information until control of the control unit is obtained.

SUMMARY OF THE INVENTION

It is therefore an object of this invention to provide an information processing system with which it is possible to input handwritten information to a common display unit from any input unit freely at anytime.

Another object of the invention is to provide a method of setting a plurality of target display regions on a common display of a electronic conference system freely from any input unit at anytime. According to a first aspect of the invention, there is provided an information processing system including at least one terminal having an input means for inputting data to the system and transmission means for outputting the data inputted from the input means; a display for displaying data; a communication line for transmitting data outputted from the terminal; and a control unit having at least one receiver buffer for storing data transmitted from the terminal via the communication line. The control unit is operable to display the data, which is stored in the receiver buffer, on the display.

Preferably the control unit is operable such that upon completion of transmission of the data from the terminal the transmitted data is displayed on the display.

Preferably the number of receiver buffers are associated with the number of terminals, and the control unit receives the data transmitted from the number of terminals.

Priorities may be assigned for the terminals, and the control unit may be operable so as to process preferentially the data transmitted from the terminal of a higher priority and to display the processed data on the display.

The plurality of terminals may have means for assigning priorities for the data inputted from the input means, and the transmission means may have a function of outputting the priority information before the inputted data.

According to a second aspect of the invention, there is provided an information processing system including a display for displaying data; at least one terminal having an input means for inputting data, a buffer for temporarily storing the data inputted from the input means, means for instructing the transmission of the data stored in the buffer, means for computing, upon receipt of an instruction from the transmission instructing means, display request region information indicating both the size of the data stored in the buffer and the shape of the data displayed on the display, and transmission means for outputting the display request region information upon termination of the computation and for subsequently outputting the data stored in the buffer; a communication line for transmitting the data outputted from the terminal; and a control unit having means for receiving the display request region information and the data via the communication line, means for setting a display region on the display based on the display request region information received by the receiving means, and means for displaying, in the display region set by the display region setting means, the data received by the receiving means. The display region setting means may be operable to discriminate whether or not it is possible to display the data in a region directly under the display region for the last-displayed data by using the display request region information, and may be operable to set, if it is possible, the region as a display region for the data or to set, if it is not possible, a display region along an imaginary reference line from the top on a side thereof which is not part of the last display region, the imaginary reference line being defined by a vertical line passing an end position of the display region for the already displayed data.

The display region setting means may be equipped with a management table in which the already set display region is registered and may be capable of setting another display region for new data received using the management table.

According to a third aspect of the invention, there is provided a method of setting a display region, on a common display of a teleconference, from a whole target display region in which data is to be displayed, which includes on the initial setting, setting a display region at an end portion of the whole target display region; and on all subsequent settings, deciding whether or not it is possible to set a display region directly before the last-set display region at a predetermined side thereof, and setting the predetermined-side display region, if it is possible, or setting, if it is not possible, a display region along an imaginary reference line from one end at a side thereof which is not used as a preceding display region, the imaginary reference line being defined by a line extending in a predetermined direction and passing a predetermined end position of the existing display region.

In operation, the users firstly input necessary information from the individual terminals, and then the inputted information is temporarily held in the respective buffers of the terminals, at which time the inputted information is not yet displayed on the common display.

When the users operate the transmission instructing means at appropriate timings, the computing means starts computing the display request region information such as the size by which the information held in the buffers is displayed. Upon termination of the computation, the transmission means transmits the display request region information and then the data held in the buffers. Regarding the data to be displayed soon, before operating the transmission instructing means, a higher priority may be assigned for that data by the data priority assigning means, in which case the priority information together with the data is transmitted.

Then the display region setting means of the control unit fetches display request region information transmitted via the communication line and stored in the receiving means such as receiver buffers and sets a display region based on the display request region information, the management table, etc.

The control unit processes the display request region information, which is transmitted from the individual terminals, basically in the order of arrival. Nevertheless, the data transmitted from a special terminal, such as the terminal possessed by the chairman, and the data set to be a higher priority are displayed preferentially.

The manner in which a display region is set by the display region setting means will now be described.

The display region setting means determines whether or not it is possible to display the data in a region directly under the display region for the last-displayed data by using the display request region information. As a result, if it is possible, the display region setting means sets the region as a display region for the data. If it is not possible, the display region setting means sets a display region along an imaginary reference line from the top on a side thereof which is not used as part of the last display region, the imaginary reference line being defined by a vertical line passing an end position of the display region for the already displayed data.

The display region setting: means sets a display region by using a management table in which the already set display region is registered.

BRIEF DESCRIPTION OF THE DRAWINGS

FIG. 4 is a diagram showing a reservation table;

DETAILED DESCRIPTION OF THE PREFERRED EMBODIMENTS

Figure 1:
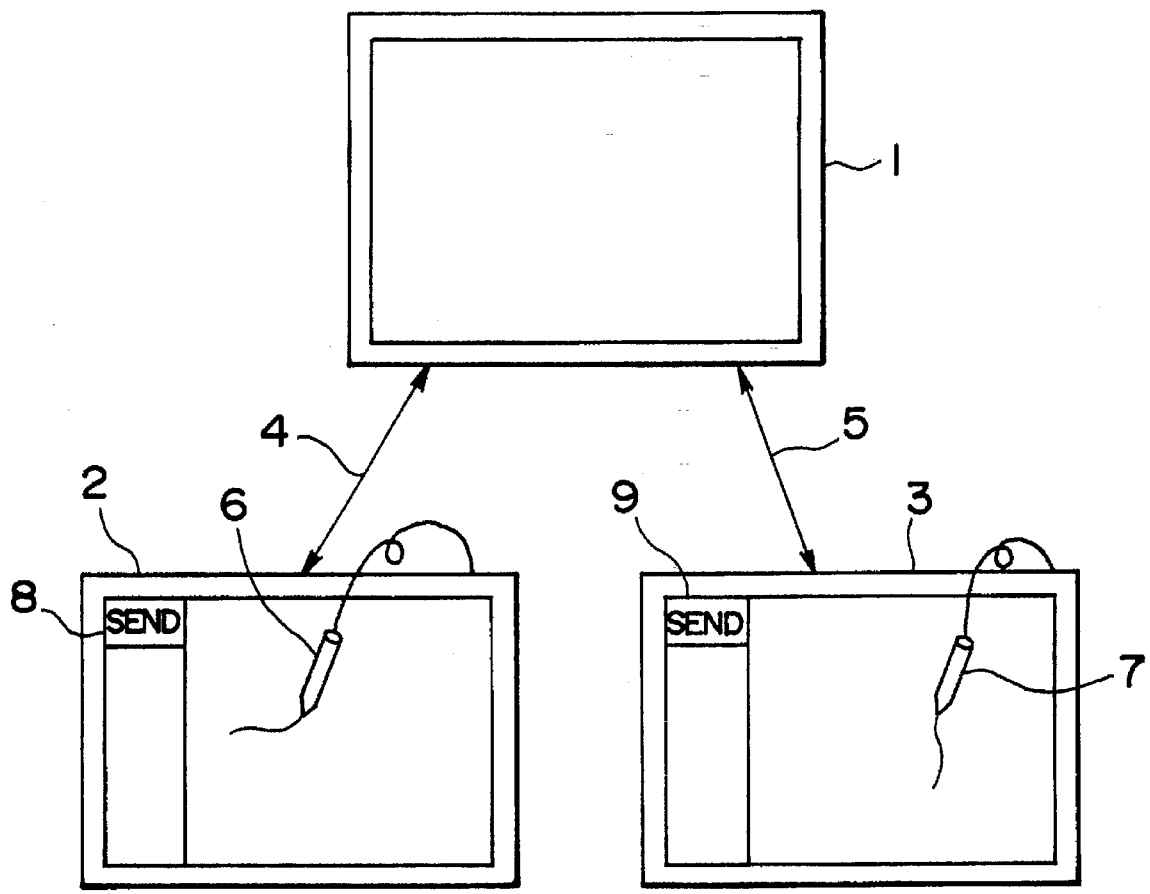
FIG. 1 is a diagram schematically showing an information processing system according to one embodiment of this invention.

One embodiment of this invention will now be described with reference to FIGS. 1 through 9. Like reference numerals designate similar parts or elements throughout several views.

FIG. 1 shows the basic construction of an information processing system of this embodiment.

The information processing system generally comprises a common display 1 to be simultaneously viewed by a number of participants of a conference, a plurality of terminals (only two terminals are illustrated here) 2, 3 at hand from which the individual participants can input handwritten information, a plurality of communication lines (only two communication lines are illustrated here) 4, 5 each connecting the common display 1 with the respective terminal 2, 3, and a plurality of input pens (only two input pens are illustrated here) 6, 7 for inputting the handwritten information from the respective terminals 2, 3.

In the system of this system, operating instructions are inputted by using the input pens 6, 7 and the display screens of the terminals 2, 3. Specifically, a menu representing an operating instruction is displayed on the display screen of the individual terminal 2, 3 at hand so that each participant or user can select a desired menu portion by the input pen 6, 7 to input the instruction. In FIG. 1, a menu "send" 8, 9, for example, instructing transmission of data to the common display I is displayed on each terminal 6, 7.

Hardware of this system will now be described in detail with reference to FIG. 2, in which parts or elements similar to those of FIG. 1 are designated by like reference numerals.

The common display 1 includes a CPU 10 for controlling the entire common display 1, a ROM 11 in which a program for the CPU 10 is stored, a RAM 12 for storing processing data, a display 13 for displaying the handwritten information sent from the terminals 2, 3, a display control unit 14 for transmitting display data to the display 13, and serial interface control units 15, 16.

The CPU 10 operates, based on a reservation table stored in the RAM 12 and the program stored in the ROM 11, to execute retrieval and display processes of a display region for the handwritten information. The software and the reservation table will be described below.

The serial interface control units 15, 16 transmit data between the terminals 2, 3. Each interface control unit 15, 16 is equipped with a receiver buffer for temporarily holding the display data transmitted from the respective terminal 2, 3 and outputs the data in the order in which it was received. Therefore the CPU 10 performs the whole displaying process on the display 13 at once upon completion of receiving of all the data.

The terminal 2 includes a CPU 17 for controlling the whole terminal 2, a ROM 18 for storing a program, a RAM 19 for storing processing data, a digitizer 20 for inputting handwritten information, a coordinate detector 21 for detecting a signal from the digitizer 20 to convert the signal into coordinate data, an input control unit 22 for serving as a receiver buffer to temporarily hold the converted coordinate data and to read the coordinate data according to the program, a liquid crystal display 23 for displaying the inputted handwritten information, a display control unit 24 for processing display information according to the program, a liquid crystal driver 25 for converting the display information, which is from the display control unit 24, into a liquid crystal driving signal, and a serial interface control unit 26 for transmitting information between the terminal 2 and the common display 1.

The liquid crystal display 23 overlies the digitizer 20 so that in response to an input to the digitizer 20, namely, in response to position designation by the input pen 6, a predetermined display is made on the screen of the display 23 at a position corresponding to the designated position. Thus the display identical in shape with the handwritten data from the input pen 6 is made on the screen of the display at the input position.

The terminal 3, like the terminal 2, includes a CPU 27, a ROM 28, a RAM 29, a digitizer 30, a coordinate detector 31, an input control unit 32, a liquid crystal display 33, a display control unit 34, a crystal driver 35, and a serial interface control unit 36. In FIGS. 1 and 2, two terminals are illustrated. This invention should by no means be limited to this illustrated example. The number of terminals may be increased commensurate with the size of a conference using this information processing system, i.e., the number of participants.

Figure 2:
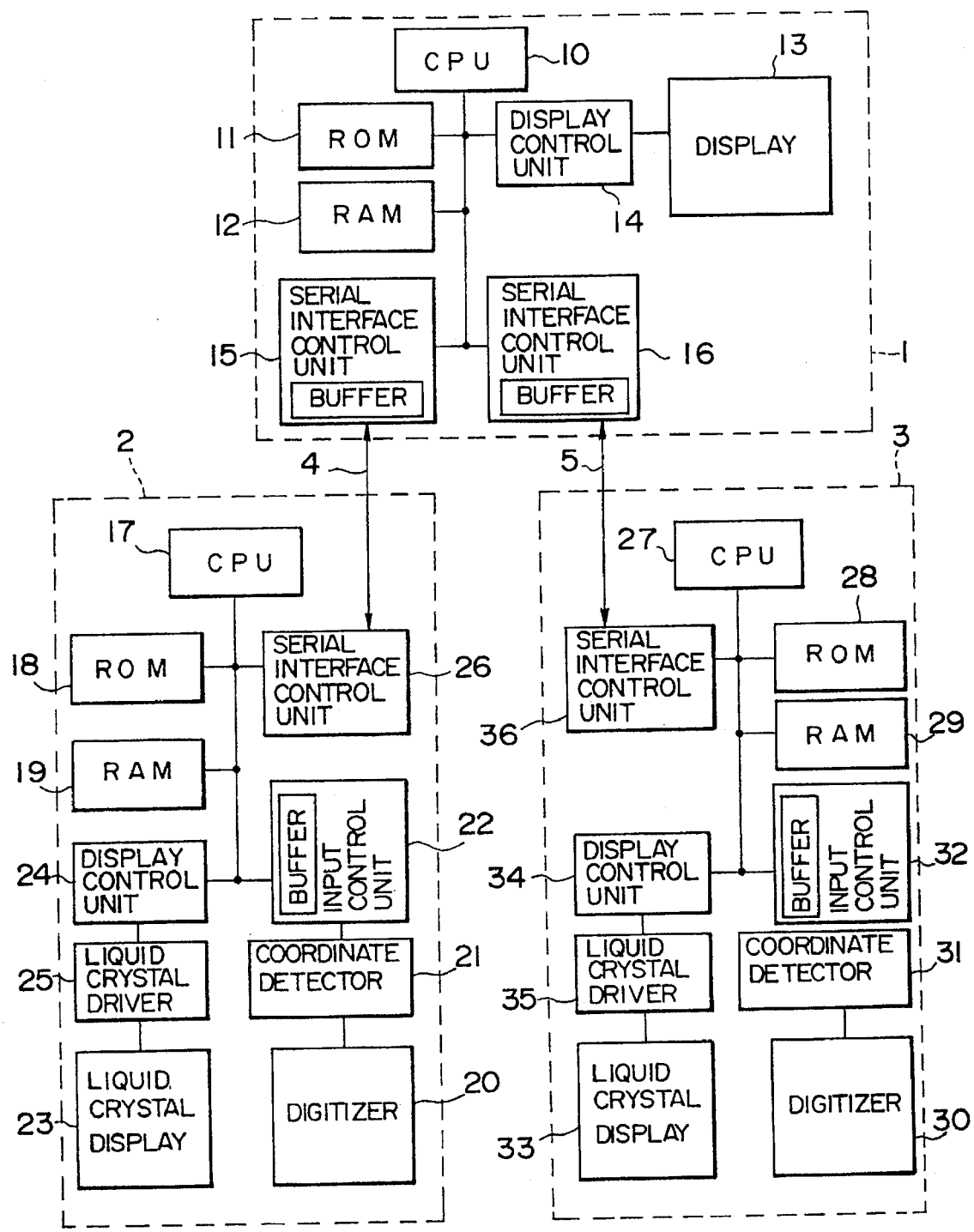
FIG. 2 is a block diagram showing hardware of the information processing system of FIG. 1.

In FIG. 2, a liquid crystal display is used for displaying handwritten information. Alternatively the display for handwritten information may be, for example, a CRT, a plasma display, an EL display or a fluorescent display tube.

Further a digitizer is used for inputting handwritten information. Alternatively a handwritten information input device may be a different type of device, such as a digitizer, a mouse or a track ball, utilizing magnetic coupling, electrostatic induction, ultrasonic conduction or piezoelectric resistance.

The communication lines 4, 5 may utilize, for example, optical fibers, electrical cables, radio or infrared ray.

The software for operating the information processing system will now be described.

Figure 3:
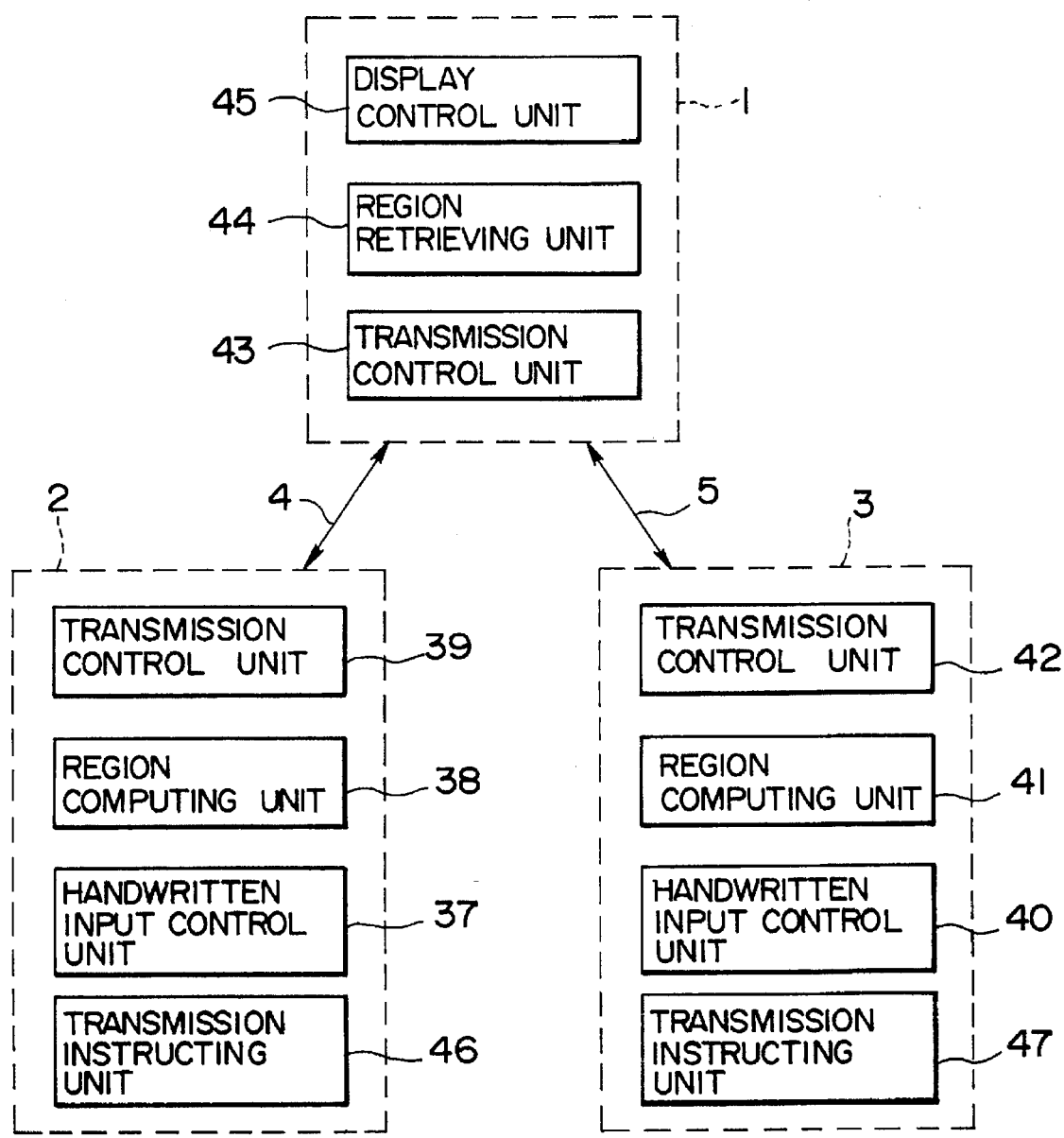
FIG. 3 is a block diagram showing software of the information processing system of FIG. 1.

As shown in FIG. 3, this software comprises a portion to be executed by the common display 1, and a portion to be executed by the terminals 2, 3 at hand.

The software in the terminal 2 comprises a handwriting input control unit 37 for holding and managing handwritten information inputted by using the input pen 6, a transmission instructing unit 46 for instructing transmission of the handwritten information, which is held by the handwritten input control unit 37, via the communication line 4 and for instructing display of the hand,written information on the common display 1, a region computing unit 38 for computing the size of a display region needed in displaying the handwritten information, and a transmission control unit 39 for transmitting the held handwritten information and also information regarding the computed display region (hereinafter called "display request region information") to the common display 1.

Likewise, the software in the terminal 3 comprises a handwritten input control unit 40, a transmission instructing unit 47, a region computing unit 41, a transmission control unit 42.

The software in the common display unit 1 comprises a transmission control unit 43 for receiving the display region information and handwritten information transmitted from the individual terminals 2, 3, a region retrieving unit, for discerning a region in which the handwritten information can be displayed, based on the received display region information, and a display control unit 45 for displaying the handwritten information in the retrieved display region.

The reservation table will now be described with reference to FIG. 4.

The reservation table is associated with the common display 1 and confirms what region of the screen of the display 13 has already been occupied with data or has been reserved for displaying data.

The reservation table is an item list composed of information ID, page, terminal No., reserved region and display flag.

Information ID is a number assigned to the written information transmitted to the common display 1 from the individual terminal. Page is a number representing a page at which a region displaying the data or reserved for displaying data exists. Terminal No. is a number representing from what terminal the handwritten information has been transmitted. Reserved region is a rectangular region occupying the screen of the display 13 to display written information and is expressed by a pair of sets of coordinate data. Display flag is a flag representing whether the region is reserved for display or handwritten information has already been displayed on the region.

For example, in FIG. 4, the written information whose information ID is 1 is information transmitted from the terminal whose terminal No. is 1. This written information occupies the region (0, 0)–(160, 120) of page 1. From display flag "displayed" it is noted that the written information has already been displayed.

The reservation table is registered every time it receives display request region information from the individual terminal, display flag then indicates "reserved" until display is executed.

The reservation table of FIG. 4 is only an illustrated example, to which this invention should by no means be limited.

The information processing system of this invention will work as follows.

Figure 5:
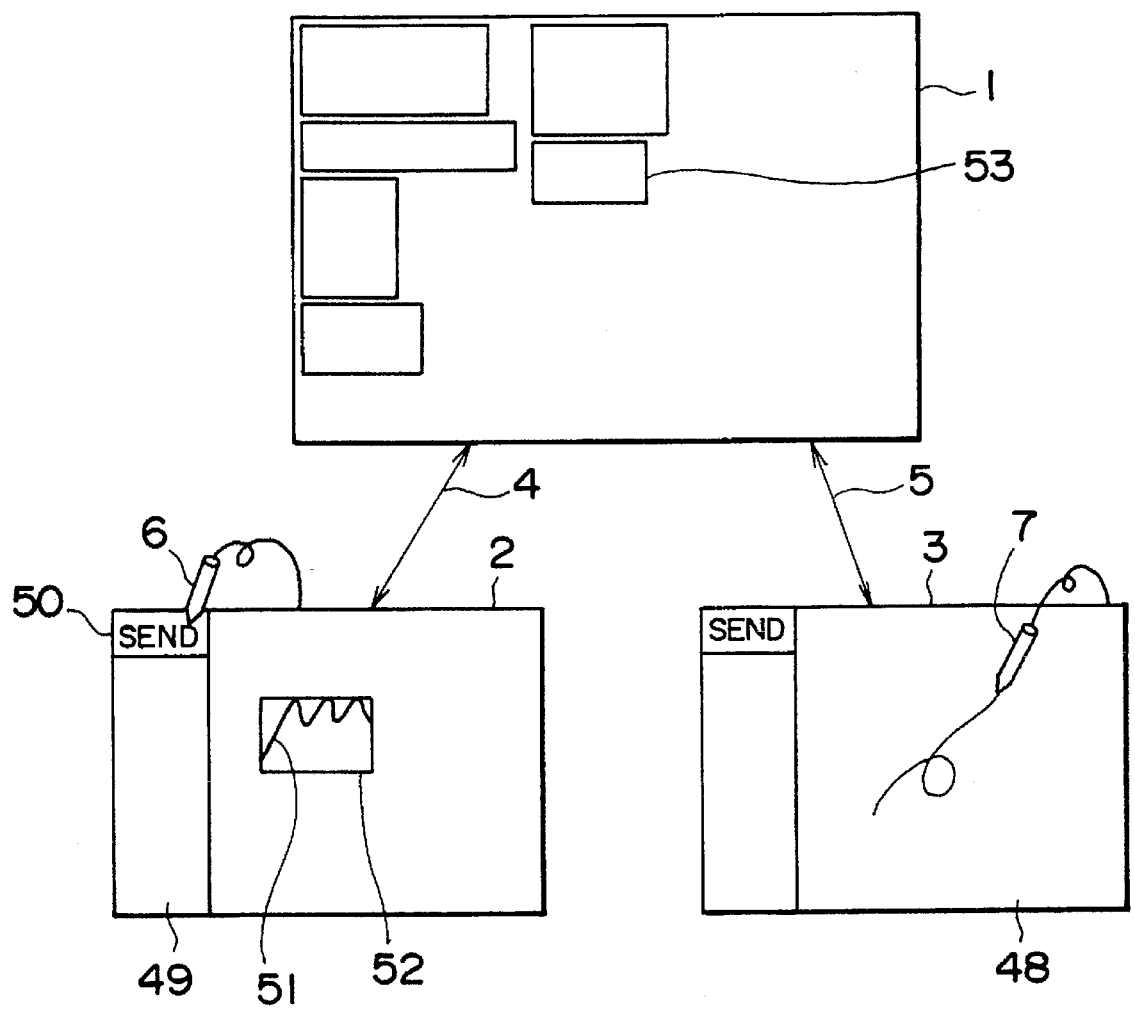
FIG. 5 is a diagram showing the manner in which handwritten information is inputted and transmitted.

Before describing the function of the individual parts or elements, the general operation and action of the information processing system will be discussed in connection with FIG. 5.

Handwritten information can be inputted to an input surface 48 of the terminal 3 at anytime by using the input pen 7.

To display the already inputted handwritten information on the common display 1, the input pen 7 is clicked on the "send" portion of the menu. For example, as shown in FIG. 5, the "send" portion 50 of the menu 49 is selected by using the input pen 6.

As a result, the inputted handwritten information 51 displayed at the terminal 2 is transmitted to the common display 1 via the communication line 4. To display the handwritten information 51, the common display 1 retrieves an appropriate empty region on the display 13. In the obtained empty region 53, the handwritten information 51 is displayed.

The processes to be executed by the common display 1 and the terminals 2, 3 will now be described in detail with reference to FIGS. 6, 7 and 8.

Figure 6:
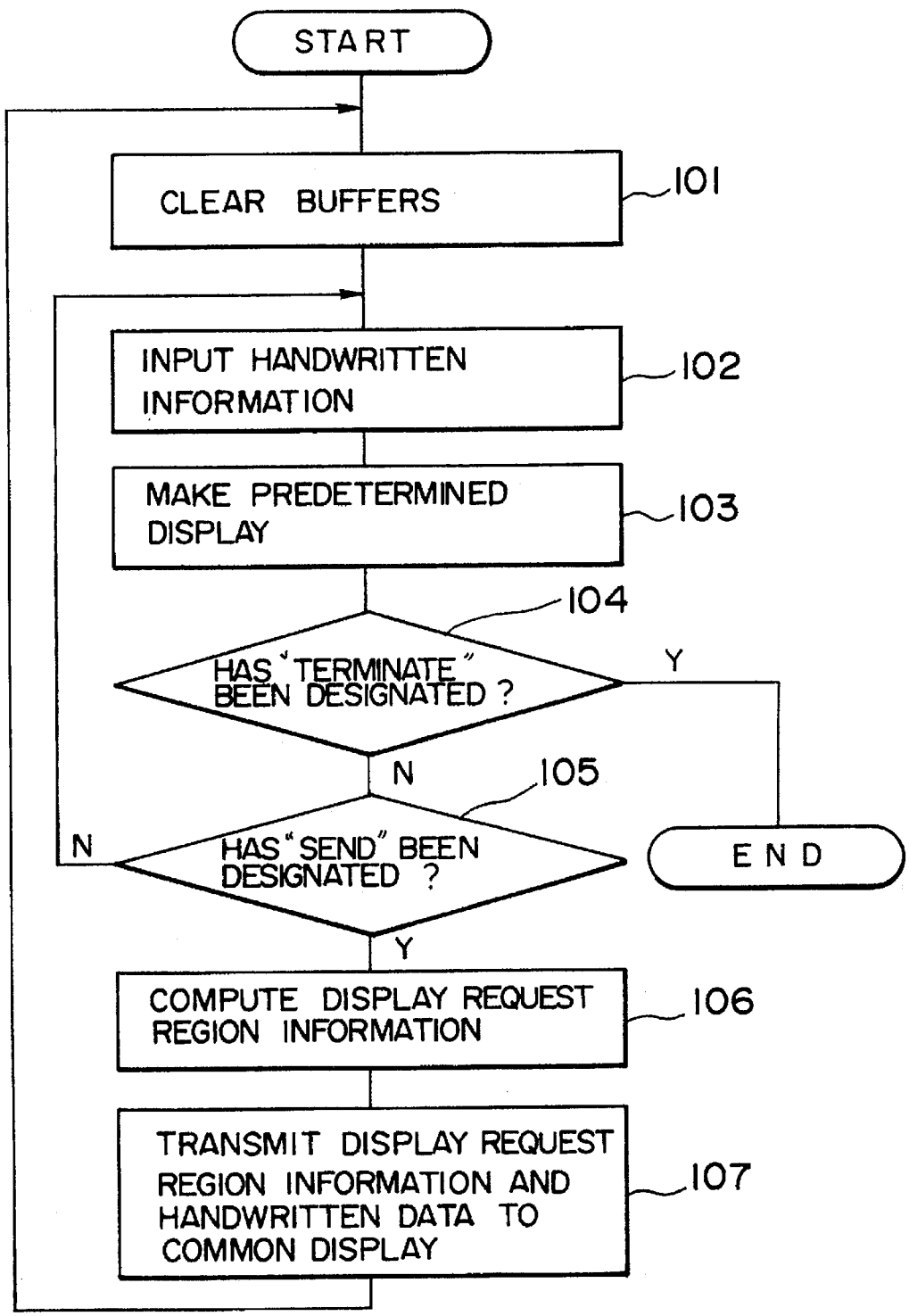
FIG. 6 is a flow diagram showing the processes to be executed by the terminal at hand.

FIG. 6 is a flow diagram showing the process to be executed by the terminals 2, 3.

After starting the operation, the handwritten input control units 37, 40 clear the buffers of the input control units 22, 32 (step 101).

Then the handwritten input control unit 37 receives handwritten information input by fetching the coordinates designated by the digitizers 20, 30 and the input pens 6, 7. This handwritten information is fetched and then held in the buffers (step 102).

Subsequently, the handwritten input control unit 37 causes the liquid crystal displays 23, 33 to make predetermined displaying at positions where handwritten input is made (step 103). The handwritten input control unit 37 then determines whether or not the input pens 6, 7 have designated "terminate" from the menu (step 104). As a result, if "terminate" has been designated, the process will terminate. If not designated, the handwritten input control unit 37 further determines whether or not the input pens 6, 7 have designated "send" from the menu (step 105). If "send" has not been designated, the routine returns to step 102 and then the same processes are repeated, thus displaying the locus of handwritten input in order. To the contrary, if designated, the region computing unit 38 starts computing the display request region information for the handwritten information held at that time (step 106). For example, the size of the display request region 52 including the handwritten information 51 in FIG. 5 is computed in a manner described below in detail.

Then, upon receipt of instructions from the transmission instructing units 46, 47, the transmission units 39, 42 transmits to the common display 1 the display request region information and the handwritten held in the buffers of the input control units 22, 32 via the communication lines 4, 5 (step 107).

After transmission has been terminated, the routine returns to step 101 and then the same processes are repeated, thus receiving the next handwritten information input.

The operation of the common display 1 will now be described with reference to FIG. 7.

Figure 7:
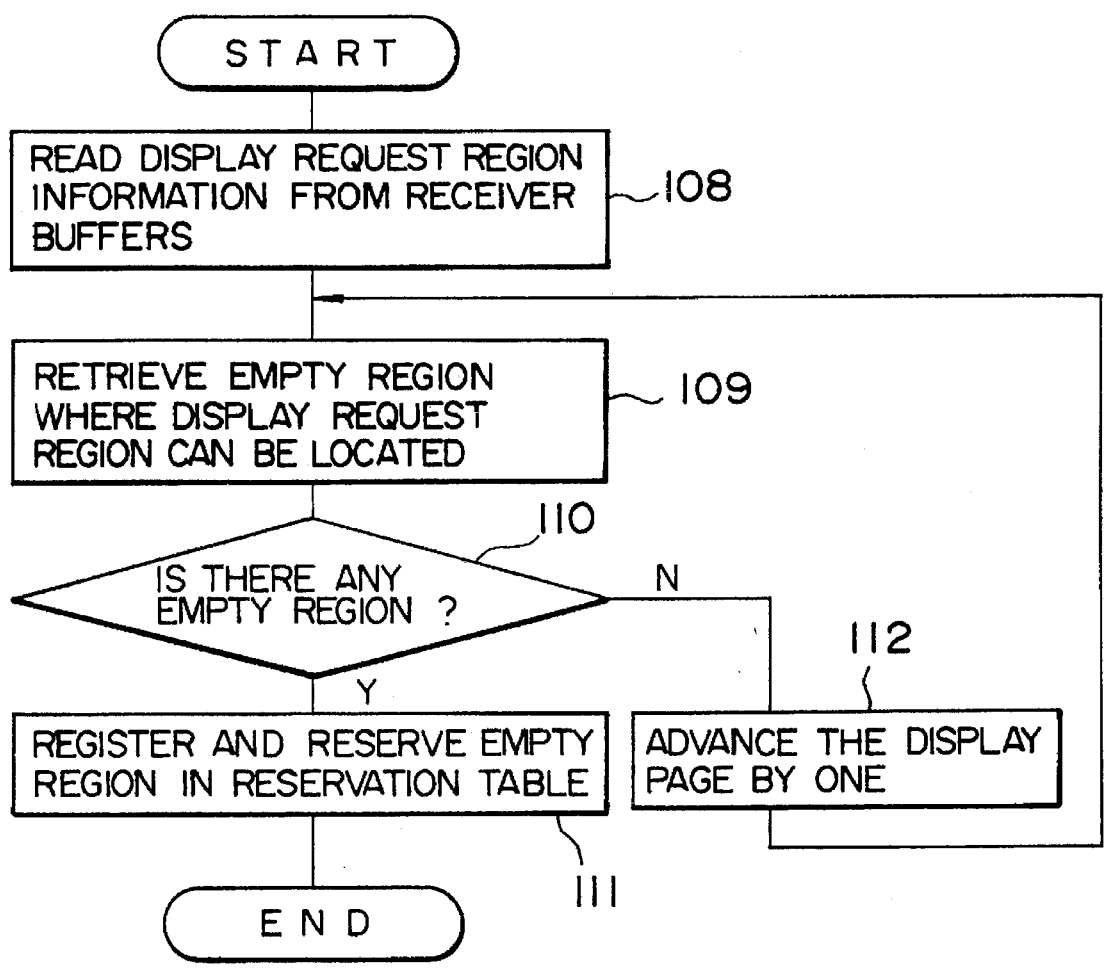
FIG. 7 is a flow diagram showing the processes to be executed by a common display upon receipt of handwritten information.

FIG. 7 is a flow diagram showing how the common display 1 operates upon receipt of the hand written information transmitted from the terminal 2, 3 at step 107 of FIG. 6.

The hand written information received by the transmission control unit 43 is stored in the receiver buffers of the serial interfaces 15, 16 in the order of being received. The region retrieving unit 44 initially reads only the display request region information from the receiver buffers (step 108). Then the region retrieving unit 44 retrieves (step 109) an empty region on the display 13 based on the display request region information and determines the result of retrieval (step 110).

As a result, if there is no, empty region, the region retrieving unit 44 advances the display page by one (step 112), returns to step 109 and retrieves an empty region again on the new display page. In the presence of an empty region, this empty region is registered in the reservation table and is reserved for display (step 111).

Thus the process when received handwritten information from the individual terminal has been completed.

At that time the received handwritten information is not displayed. The reason is that since generally the rate of displaying handwritten information is higher than the rate of receiving the handwritten information via the communication lines 4, 5, a waste of display standby time would occur if it started displaying the handwritten information while receiving the information. Consequently, wherein the state of reserving the empty region, displaying is not started until after all of the reserved handwritten information is received. However, if the receiving rate is adequately higher than the displaying rate, it is not the case.

The sequence of displaying processes will be described below.

The method of empty region retrieval to be performed at step 110 of FIG. 7 will now be described with reference to FIG. 8.

Figure 8:
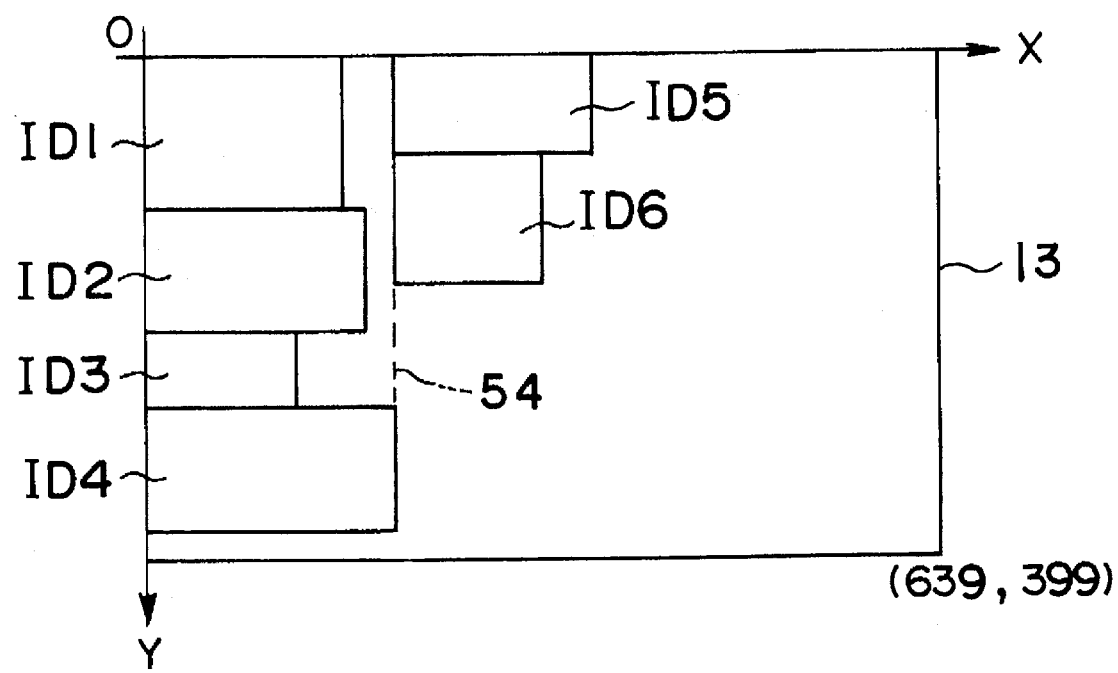
FIG. 8 is a diagram showing the manner in which empty regions are retrieved.

In FIG. 8, ID1 through ID6 stand for the information ID1 through information ID6, respectively, of FIG. 4. In this embodiment, the display 13 uses a coordinate system with a display resolution of 640 dots and 400 lines. This invention should by no means be limited to this illustrated example.

Assuming that handwritten information is transmitted from the terminal 2 (hereinafter the number for the common display 1 to identify this terminal is "1") if no handwritten information is displayed on the common display I or if no reservation is made in the reservation table, "1" is allocated to the handwritten information as information ID. At that time the region retrieving unit 44 sets a necessary display region at the left upper corner of the display screen.

Subsequently when handwritten information is transmitted from the terminal 3 (hereinafter the number for the common display 1 to identify this terminal is "2"), "2" is allocated to the handwritten information as information ID. The region retrieving unit 44 sets and reserves, directly under the region in which the information of information ID1, a region for displaying the information of information ID2.

The information of information ID1 and the information of information ID2 are hereinafter known simply as information ID1 and information ID2, respectively. Likewise the information of information IDn is called simply information IDn.

When handwritten information is transmitted, information IDs are set in the order of transmission. The display region is then allocated from the left upper corner of the display 13 in the order of descending information IDs, i.e., in the order of transmission.

If there is only an insufficient display region under the already occupied region when additional handwriting is transmitted, an imaginary reference line is set at the right side of the previously set display region, and then a display region is set again from the top along the reference line. For example, since there exists under the information ID4 a region in which information can be displayed, an imaginary reference line 54 is set. Successive regions for displaying information are allocated from the top along the reference line 54, and information ID5 and information ID6 are allocated to the respective regions.

In this embodiment, the reference line is set at the rightmost portion of the vertically overlapping display regions. In the example of FIG. 8, the reference line 54 is set at the right end position of the display region of information ID4, which is the rightmost portion of the display regions of information ID1 through information ID4.

This setting method should by no means be limited to this illustrated example.

Figure 9:
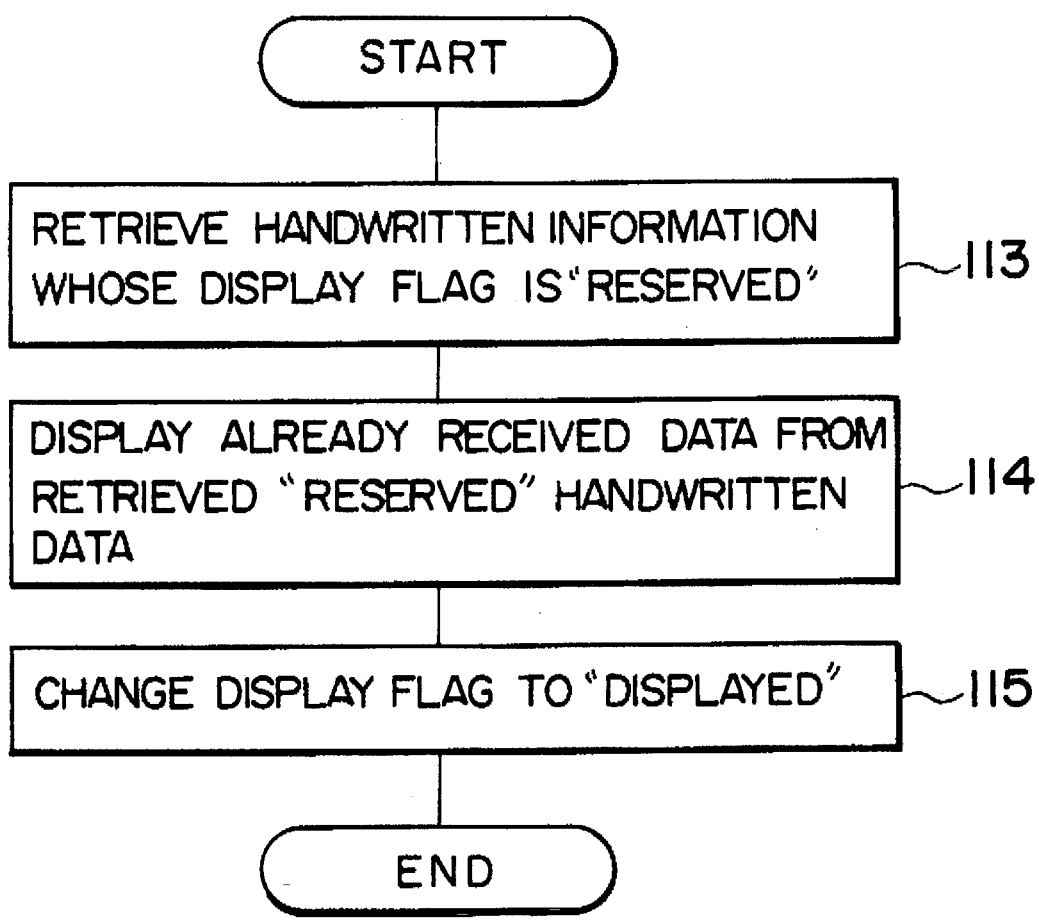
FIG. 9 is a flow diagram showing the processes to be executed by the common display when displaying handwritten information in a reserved region.

FIG. 9 is a flow diagram showing the content of the displaying process.

As mentioned above, even if a display region has been reserved in the reservation table, the display control unit 45 will not immediately start displaying until it has received all of the handwritten information.

After the operation is started, the display control unit 45 retrieves the handwritten information, whose display flag is "reserved", from the reservation table (step 113). Then the display control unit 45 will reserve the already received data from the retrieved "reserved" handwritten information. The display control unit 45 reads the retrieved handwritten information from the receiver buffers of the serial interface control units 15, 16 and display the read-out handwritten information (step 114), whereupon it will change the reservation flag of the completely displayed information to "displayed" (step 115).

With the information processing system of this embodiment, since the common display 1 has a receiver buffer and a serial interface control unit associated with each terminal, the common display 1 can simultaneously receive all of the information transmitted from the plurality of terminals. Since displaying of handwritten information is started upon completion of receiving the handwritten information to be: displayed, a high-speed displaying process can be achieved, without being influenced by the rate of transmission of the information from the terminals. Therefore as the CPU 10 is free from being occupied by a single terminal for a long time, a handwritten input can be made to the common display at anytime from any terminal.

The common display 1 is equipped with a reservation table having the occupied regions and the coordinates of the reserved regions so that when retrieving from the reservation table a region in which information can be displayed, it is unnecessary that the user should designate the display coordinates from the terminal.

In this embodiment, the region for displaying each handwritten information is illustrated with a frame. Alternatively this frame may be omitted.

Further in this embodiment, the common display 1 processes the received handwritten data in the order in which it was received. Alternatively the common display I may be equipped with means for assigning a higher priority for a particular terminal and for assigning priorities for the terminals, thus giving priorities for the inputted data. In this case, the common display 1 discriminates between the priorities of the input information and displays the input information in the order of descending priorities. Assuming that only the terminal of the chairman of a conference has a higher priority, it is possible to streamline the progress of the conference. It is also possible to display important materials before the other information.

Figure 10:
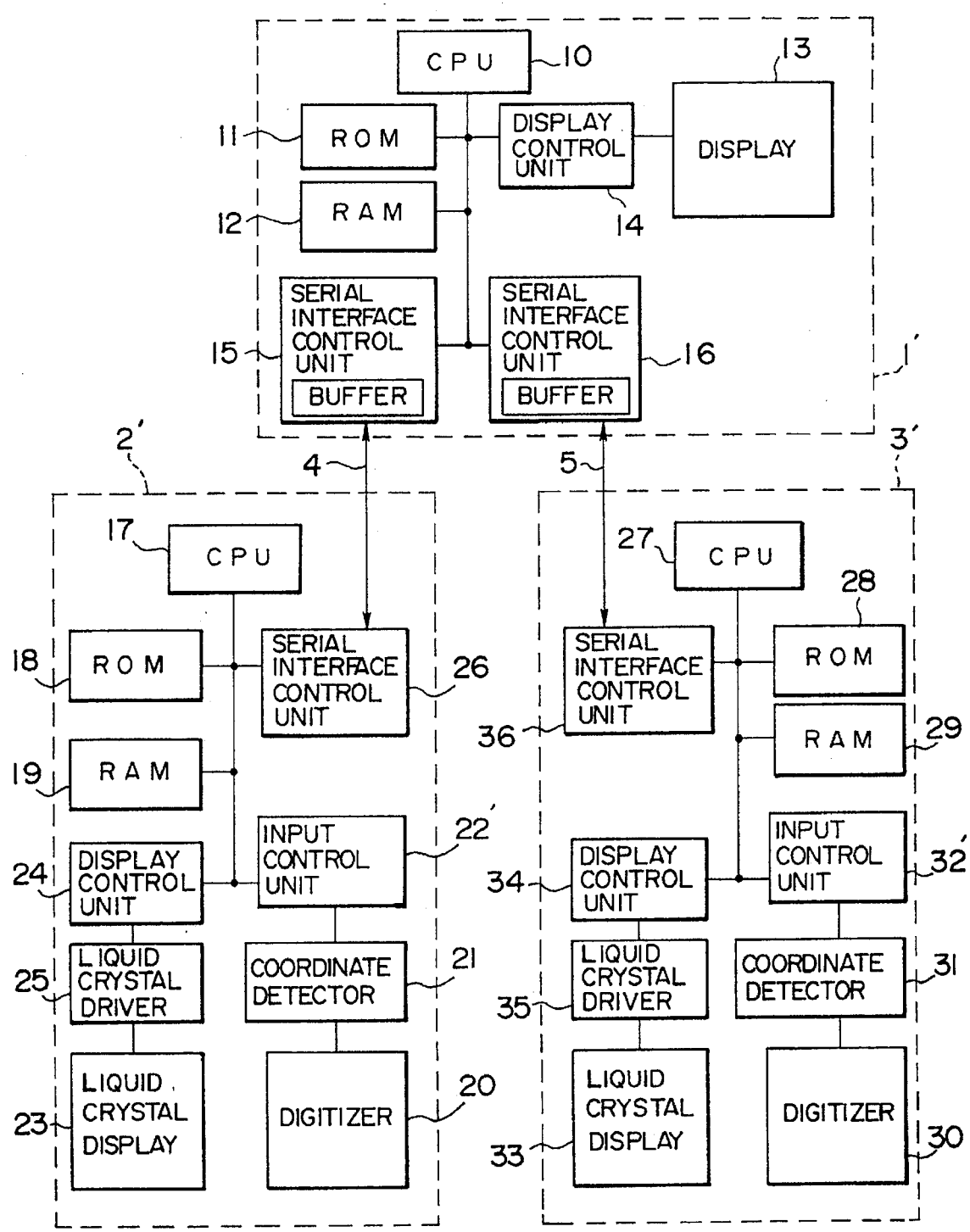
FIG. 10 is a block diagram showing hardware of a modified system according to another embodiment.

FIG. 10 shows the hardware of the information processing system according to this embodiment. The hardware of this embodiment is identical with that of the foregoing embodiment except that the input control units 22', 32' are equipped with buffers.

Figure 11:
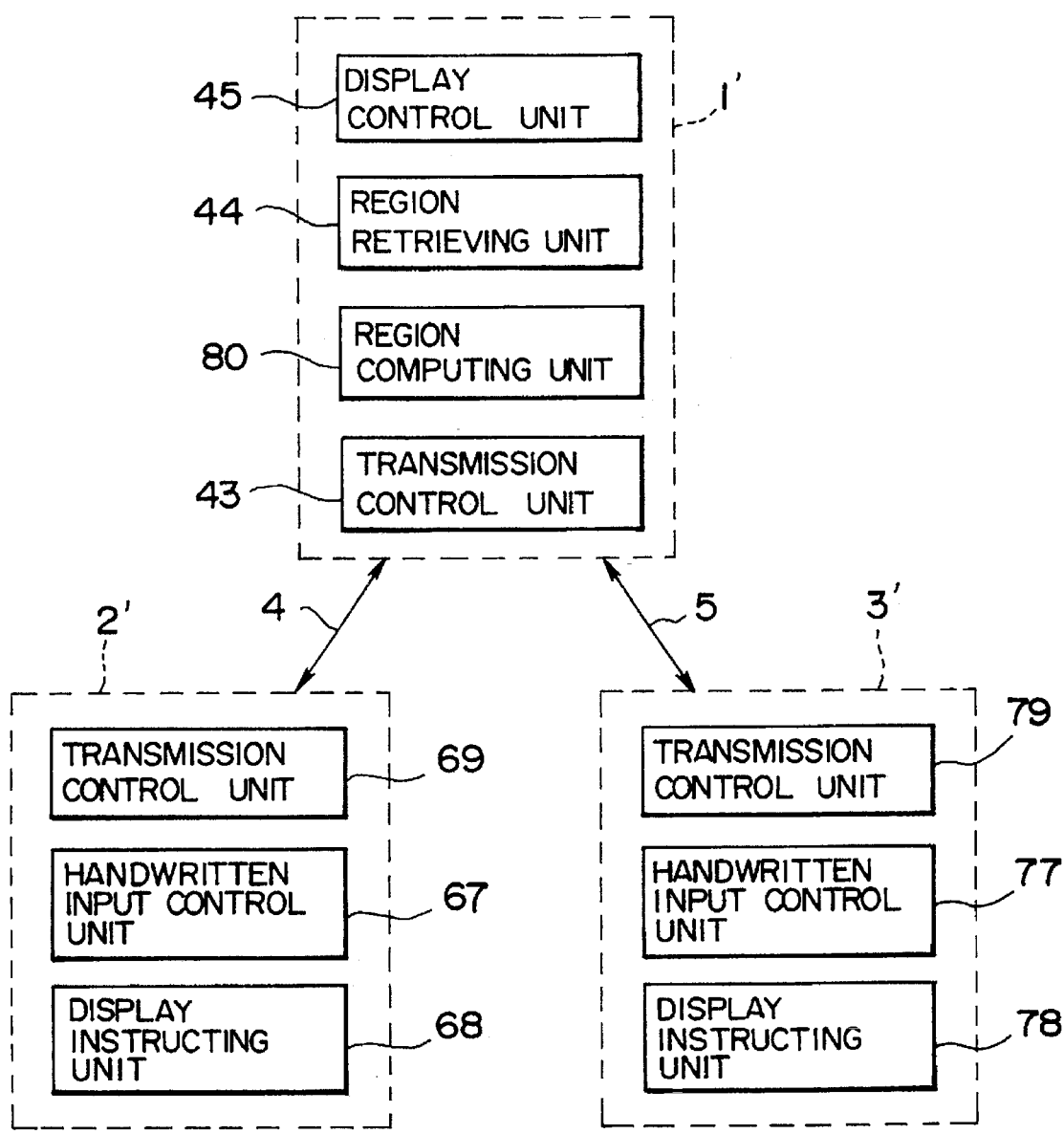
FIG. 11 is a block diagram showing software of the modified system of FIG. 10.

The software for operating the information progressing system of this embodiment will now be described with reference to FIG. 11.

The software in the terminal 2' comprises a handwritten input control unit 67 for holding and managing the handwritten information inputted by the input pen, a transmission control unit 69 for transmitting the inputted handwritten information successively via the communication line 4, and a display instructing unit 68 for instructing the common display 1 to display the handwritten information.

Likewise the software in the terminal 3' comprises a handwritten information input control unit 77, a display instructing unit 78, and a transmission control unit 79.

The software in the common display 1' comprises a transmission control unit 43 for receiving the display region information and handwritten information transmitted from the individual terminals 2', 3', a region computing unit 80 for monitoring information transmitted from the individual terminals and for computing display request region information showing the size of a display region needed for the handwritten information being received when a command instructing displaying is input, a region retrieving unit, for retrieving a region in which the handwritten information can be displayed, based on the received display region information, and a display control unit 45 for displaying the handwritten information in the retrieved display region.

Figure 12:
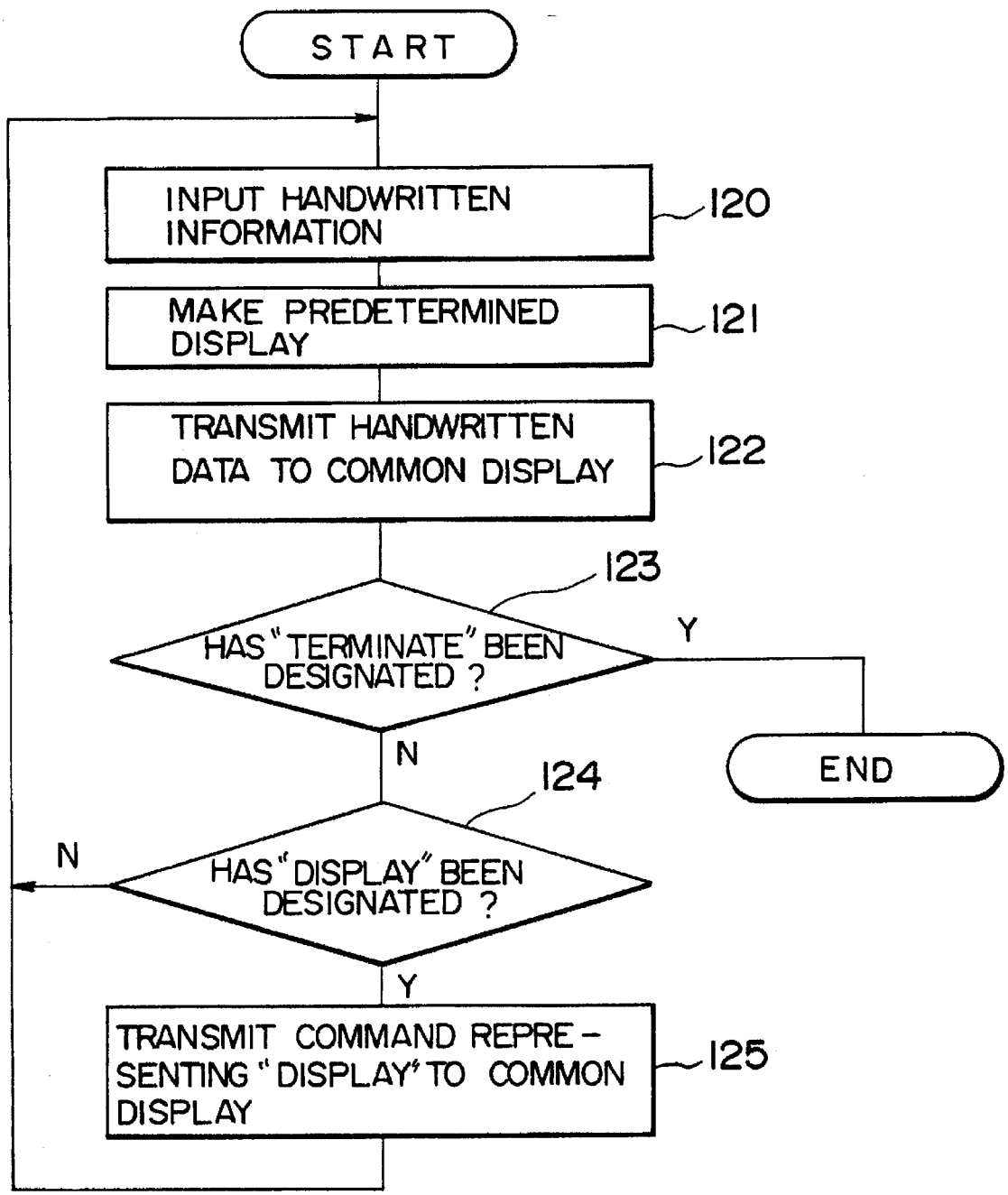
FIG. 12 is a flow diagram showing the processes to be executed by the terminal at hand.

FIG. 12 is a flow diagram showing the sequence of processes to be executed by the individual terminal.

When information is inputted to the digitizers 20, 30, the handwritten input control units 67, 77 fetch the designated coordinates as handwritten input data (step 120) and display the locus of the handwritten input on the liquid crystal displays 23, 33 according to the coordinate data (step 121).

Simultaneously with this, the transmission control unit 69 transmits the handwritten data to the common display 1' via the serial interface control units 26, 36 (step 122).

Then the transmission control unit 69 confirms whether or not "terminate" has been selected from the menu by the input pen (step 123) and terminates its operation if "terminate" has been selected. If not selected, the transmission control unit 69 determines whether or not "display" has been selected from the menu (step 124).

If "display" has not been selected, the routine returns to step 120 so that the transmission control unit 69 receives an input by the input pen and then transmits the inputted handwritten information successively to the common display 1.

At step 124, if "display" has been displayed, the individual display instructing unit 68, 78 transmits a command representing "display" to the common display 1' via the respective serial interface control unit 26, 36 (step 125). Then the routine returns to step 120 and the same processes are repeated.

Figure 13:
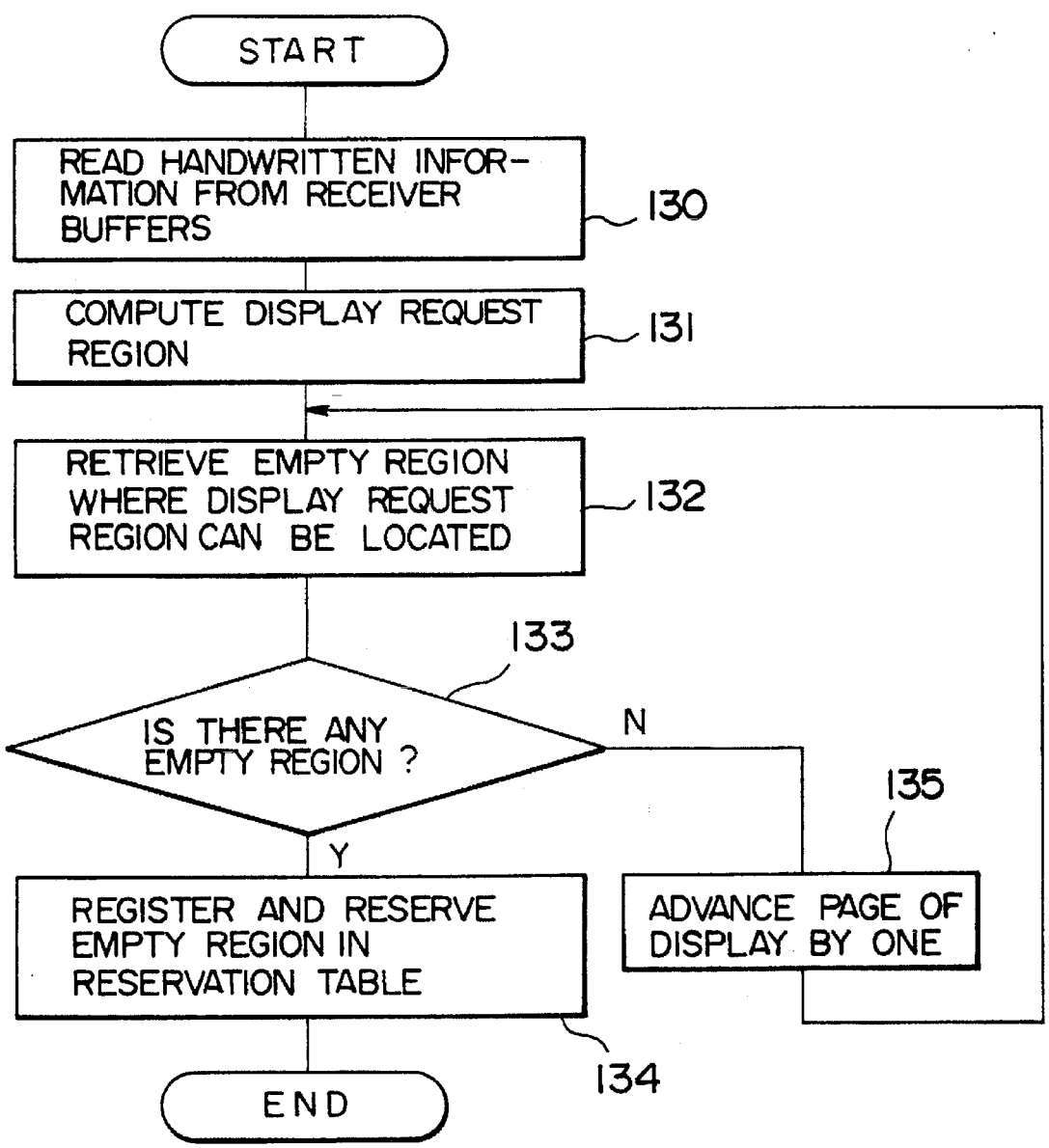
FIG. 13 is a flow diagram showing the processes to be executed by the common display.

The operation of the common display 1' upon receipt of a command "display" will now be described with reference to FIG. 13.

When it has received a command "display", the region computing unit 80 starts reading handwritten information from the receiver buffer (step 130). The region computing unit 80 then computes the necessary display request region based on the handwritten information (step 131). The region retrieving unit 44 retrieves an empty region in which the display request region can be located (step 132). As the result of this retrieving, if there is no empty region, the region retrieving unit 44 progresses the page of display by one (step 135). Then the routine returns to step 132, and the region retrieving unit 44 retrieves an empty region.

At step 133, in the presence of an empty region, the region retrieving unit 44 registers and reserves the empty region in the reservation table (step 134).

The retrieving of the empty region, details of registration and reservation of the empty region in the reservation table, and the execution of displaying are the same as in the previous embodiment.

In this embodiment, since the terminal requires no buffer for holding and managing handwritten information, it is possible to reduce the cost of production.

According to the information processing system of this invention, it is possible to reduce a standby time when inputting handwritten information from the terminal. Since the rate of display information is not limited or influenced by the rate of transmitting information, it is possible to substantially increase the displaying rate. Further since it is not necessary to designate a region in which information is to be displayed, an improved degree of operability can be realized.

Furthermore, since predetermined information can be displayed preferentially, it is possible to streamline the progress of a conference using the information processing system of this invention.

What is claimed is:

1. An information processing system for supporting a conference in which a plurality of participants can meet face to face and view the same data at the same time, comprising:

(a) a plurality of terminals, each terminal having input means for inputting data to said terminal and transmission means for outputting the data inputted to said terminal by said input means;

(b) a display for displaying the data, said display being constructed to permit all of the participants in the conference to view the data being displayed on said display at the same time;

(c) a communication line for transmitting the data outputted from said terminal by said transmission means; and (d) a control unit having a plurality of receiver buffers, each receiver buffer stores the data transmitted from one of said terminals via said communication line, said control unit being operable to display the data, which is stored in each of said receiver buffers, on said display at the same time.

2. An information processing system according to claim 1, wherein said control unit is operable, to start, upon completion of transmission of the data from said terminal, displaying the transmitted data on said display.

3. An information processing system according to claim 1, wherein each receiver buffer is associated with one of said terminals, said control unit being capable of receiving the data transmitted from said terminals.

4. An information processing system according to claim 1, wherein priority levels are assigned to each of said terminals, said control unit being operable to process preferentially the data transmitted from one of said terminals having a higher priority level and to display the processed data on said display.

5. An information processing system according to claim 1, wherein each terminal includes means for assigning priority levels to the data inputted to said terminals by said input means, said transmission means having a function of outputting the priority levels along with the data inputted by said input means.

6. An information processing system according to claim 1, wherein said control unit comprises:

means for computing, upon completion of transmission of the data from one of said terminals, display request region information indicating both the size of the data stored in a corresponding buffer and the shape of the data displayed on said display; and means for setting a display region on said display based on the display request region information computed by said computing means.

7. An information processing system according to claim 6, wherein each of said receiver buffers is associated with one of said terminal.

8. An information processing system according to claim 6, wherein said display region setting means is equipped with a management table in which the already set display region is registered and is capable of setting another display region for new data received using said management table.

9. An information processing system according to claim 8, wherein said management table has a display flag indicating whether the data has already been displayed in the display region set by said display region setting means.

10. An information processing system according to claim 1, wherein said input means is a coordinate input unit.

11. An information processing system according to claim 1, wherein said input means includes at least one of a digitizer, a mouse, a track ball and an input pen.

12. An information processing system according to claim 1, wherein said input means is a terminal display for displaying the inputted data.

13. An information processing system for supporting a conference in which a plurality of participants can meet face to face and view the same data at the same time, comprising:

(a) a display for displaying data, said display being constructed to permit all of the participants in the conference to view the data being displayed on said display at the same time;

(b) a plurality of terminals, each terminal having an input means for inputting data to said terminal, a buffer for temporarily storing the data inputted from said input means, means for instructing transmission of the data stored in said buffer, means for computing, upon receipt of an instruction from said transmission means instructing means, display request region information indicating both the size of the data stored in said buffer and the shape of the data displayed on said display, and transmission means for outputting the display request region information upon termination of the computation and for subsequently outputting the data stored in said buffer;

(c) a communication line for transmitting the data outputted from said terminal; and (d) a control unit having means for receiving the display request region information and the data via said communication line from said terminals, means for setting display regions on said display based on the display request region information received by said receiving means, and means for displaying at the same time, in the display regions set by said display region setting means, the data received by said receiving means from said terminals.

14. An information processing system according to claim 13, wherein said display region setting means is operable to determine whether or not it is possible to display the data in a region directly under the display region for the last-displayed data by using the display request region information, and is operable to set, if it is possible, said region as a display region for the data or to set, if it is not possible, a display region along an imaginary reference line from the top on a side thereof which is not of the last display region, said imaginary reference line being defined by a vertical line passing an end position of the display region for the already displayed data.

15. An information processing system according to claim 13, wherein said display region setting means is equipped with a management table in which the already set display region is registered and is capable of setting another display region for new data received using said management table.

16. An information processing system according to claim 13, wherein said receiving means has a receiver buffer for temporarily storing the received data, said display region setting means being capable of registering the already set display region at the start of receiving the data and being capable of starting, upon completion of receiving the data, display of the transmitted data on said display.

17. An information processing system according to claim 15, wherein said management table has a display flag indicating whether the data has already been displayed in the display region set by said display region setting means.

18. An information processing system according to claim 13, wherein said input means is a coordinate input unit.

19. An information processing system according to claim 13, wherein said input means is a terminal display for displaying the inputted data.

* * * * *